United States Patent [19]

Van Voorhis

[11] 4,090,174

[45] May 16, 1978

[54] METHOD AND APPARATUS FOR ACCESSING HORIZONTAL SEQUENCES, VERTICAL SEQUENCES AND RECTANGULAR SUBARRAYS FROM AN ARRAY STORED IN A MODIFIED WORD ORGANIZED RANDOM ACCESS MEMORY SYSTEM

[75] Inventor: David Curtis Van Voorhis, Los Gatos, Calif.

[73] Assignee: International Business Machines Corporation, Armonk, N.Y.

[21] Appl. No.: 737,501

[22] Filed: Nov. 1, 1976

[51] Int. Cl.[2] .......................... G06K 9/00; G06F 15/20

[52] U.S. Cl. .......................... 340/146.3 MA; 364/900

[58] Field of Search ................. 340/146.3 MA; 444/1; 364/900; 235/151

[56] References Cited

U.S. PATENT DOCUMENTS

| | | | |
|---|---|---|---|
| 3,899,771 | 8/1975 | Saraga et al. | 340/146.3 MA |
| 3,938,102 | 2/1976 | Morrin et al. | 340/146.3 MA |
| 3,995,253 | 11/1976 | Morrin et al. | 340/146.3 MA |
| 3,996,559 | 12/1976 | Morrin et al. | 340/146.3 MA |

*Primary Examiner*—Leo H. Boudreau

*Attorney, Agent, or Firm*—Otto Schmid, Jr.

[57] ABSTRACT

A conventional word organized random access memory is modified for image processing operations so that the $pq$ image points of any $1 \times pq$, $pq \times 1$ or $p \times q$ subarray of an $rp \times sq$ or smaller image array stored in the memory can be extracted or updated in a single memory cycle. The invention contemplates $pq + 1$ memory modules labeled from 0 to $pq$ for storing the image points, each module being capable of storing $rs$ points in distinguishable cells, only one cell of which is randomly accessible in a single instant of time. The invention further contemplates accessing circuitry for causing each image point $I(i,j)$ of an image array to be routed to or from a memory module $M(i,j)$ according to the relative $M(i,j) = (iq+j)//(pq+1)$, where the notation "//" denotes the remainder resulting from integer division. The accessing circuitry additionally causes image point $I(i,j)$ to be stored into or retrieved from a cell location $A(i,j)$ of module $M(i,j)$ according to the relation $A(i,j) = (i/p)s + (j/q)$.

8 Claims, 11 Drawing Figures

AN OVERVIEW OF THE MEMORY SYSTEM

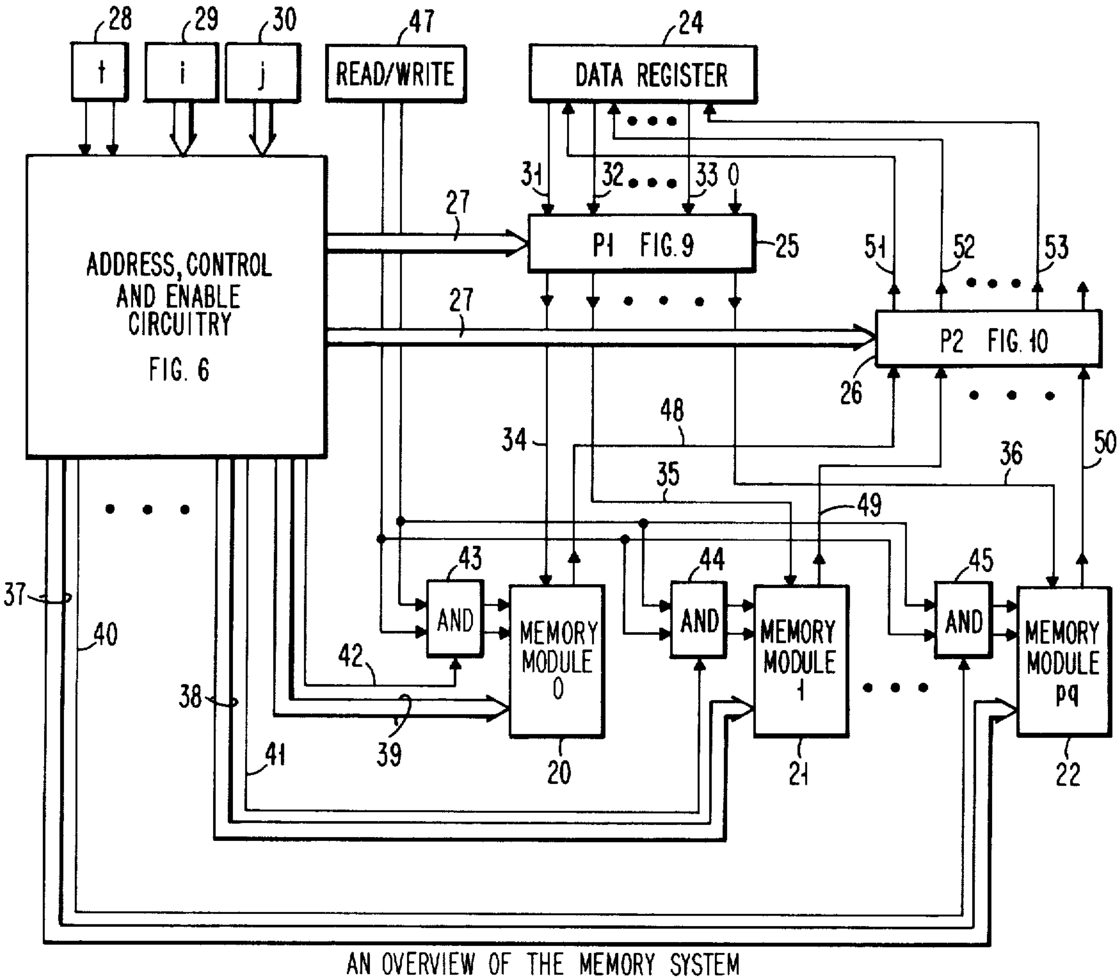
AN OVERVIEW OF THE MEMORY SYSTEM
FIG. 1
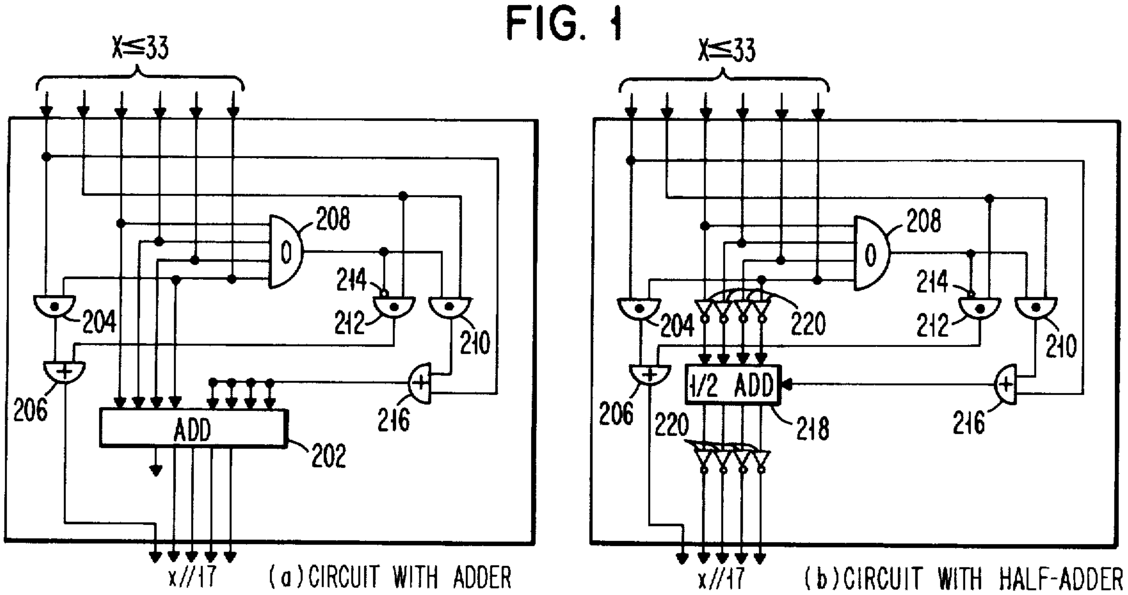
FIG. 2 TWO ORGANIZATIONS FOR A MOD-17A CELL 16x//17
MOD-17B CELL USING ADDERS, MOD-17A CELLS, AND MOD-17B CELLS TO CALCULATE (4i+j)//17

GLOBAL LOGIC

MODULE LOGIC

ROUTING CIRCUIT P1

ROUTING CIRCUIT P2

METHOD AND APPARATUS FOR ACCESSING HORIZONTAL SEQUENCES, VERTICAL SEQUENCES AND RECTANGULAR SUBARRAYS FROM AN ARRAY STORED IN A MODIFIED WORD ORGANIZED RANDOM ACCESS MEMORY SYSTEM

BACKGROUND OF THE INVENTION

This invention relates to an access method and apparatus for selectively extracting or updating subarrays of a larger array stored in a modified word organized random access memory, and more particularly, relates to the modifications to a conventional word organized memory used for image processing.

A digital image is considered to be a two-dimensional array of image points, each of which comprises an integer or a set of integers. Image manipulation ideally includes the capability of storing an image array in a memory and operating upon selected clusters of points simultaneously, such as sequences of points in a single row or column of the array and points within a small rectangular area. This imposes the constraint that the memory must allow all points in any selected cluster to be accessed in one memory cycle. If any desired combination of points in the array could be accessed simultaneously from a bit addressable memory, then storage and retrieval of clusters of image points would pose no problem. However, because digital images form large arrays, only word organized memories are economically available. A conventional word organized memory includes a plurality of randomly accessible "words" of storage locations, each word of which can store a cluster of image points. However, it is necessary to modify the accessing mechanism of this conventional memory in order to permit access to clusters of image points when the points are not all in the same word of storage.

An image can be represented by an M $\times$ N array I(*,*) of image points, where each point $I(i,j)$ for $0 \leq i < M$ and $0 \leq j < N$ is an integer or a set of integers which represents the color and intensity of a portion of the image. For simplicity, attention can be restricted to black/white images, for which $I(i,j)$ is a single bit of information. Typically, $I(i,j)=1$ represents a black area of the image, and $I(i,j)=0$ represents a white area.

Images are most commonly generated by scanning pictorial data, such as that from documents. Thereafter, these images can be stored, viewed from a display, transmitted, or printed. Since most scanners and printers process an image from top to bottom and from left to right, images are normally transmitted in the standard "row major" sequence: I(0,0), I(0,1), . . ., I(0,N1), I(1,0), . . ., I(M1,N1). Therefore, a memory system for image processing operations should at least permit simultaneous access to a number of adjacent image points on a single row of I(*,*). This would permit the image or a partial image to be transferred rapidly into and out of the memory system, with many image points in each row being transferred simultaneously.

For image processing operations, such as character recognition, it is necessary to rotate an image or a partial image by a multiple of ninety degrees. Such rotations are greatly facilitated by a memory system that permits simultaneous access to a number of adjacent points along any row or column of the image array I(*,*). A memory system that permits such accesses can be used to rotate by ninety degrees (counter-clockwise) an image transmitted in row major sequence. This is attained by (1) the transfer of the image into the memory row by row, starting with the uppermost row and storing many image points in each row simultaneously; and (2) the transfer of the image out of the memory column by column, starting with the rightmost column and retrieving many image points in each column simultaneously.

It is also desirable to access rectangular blocks of points within an image to accommodate another class of image processing operations, such as block insertion, block extraction, and contour following. For example, it may be desirable to add alphanumeric characters to the image from a stored dictionary, which dictionary includes a predefined bit array for each character. Similarly, it may be desirable to delete or edit characters or other rectangular blocks from an image. Lastly, algorithms for locating the contours of objects in the image involve moving a cursor from one image point to another along a border or boundary of an object. The contour following algorithms require rapid access to an image point and a plurality of its near neighbors, which together constitute a block of image points.

Typically, a word organized random access memory comprises a plurality of memory modules, each module being a storage device with a plurality of randomly accessible storage cells. Although each cell is able to store an image point which comprises a single bit of information, only one cell in a module can be accessed (read from or stored into) at a time. The accessing mechanism of a conventional word organized random access memory provides a single cell address to all of its constituent memory modules, so that the *i*th cell in one module can be accessed only in conjunction with the *i*th cell of all other modules. These cells together comprise the *i*th word of the memory. A conventional word organized random access memory thus provides access to a cluster of image points only if they are all stored in the same word of the memory. However, a suitable modification of the accessing mechanism for a word oranized memory can permit access to any desired cluster of image points, provided each module stores at most one point in the cluster.

As previously stated, a memory system is desired which permits simultaneous access to horizontal sequences, vertical sequences, and rectangular blocks of image points. If the desired horizontal and vertical sequences include $pq$ image points, and if the dimensions of the desired blocks of image points are $p \times q$, then a memory system with at least $pq$ memory modules is required. Furthermore, a method for distributing the image points of an image array I(*,*) among memory modules must be designed which places the $pq$ elements of each $1 \times pq$, $pq \times 1$, or $p \times q$ subarray of I(*,*) in distinct modules. It is necessary to design accessing circuitry which permits simultaneous access to these subarrays, and which arranges their elements into a convenient order, such as row major order.

To minimize the cost of a memory system for image processing, it is desirable to limit the number of memory modules in the memory system to the minimum number. At least $pq$ memory modules are required, since each of the desired subarrays comprises $pq$ image points. However, it can be shown that no memory system with only $pq$ memory modules can permit access to all $1 \times pq$, $pq \times 1$, and $p \times q$ subarrays of an image array I(*,*). For this reason, some previously described memory systems have been restricted to $pq$ memory modules and hence have not provided access to all of these subarrays. It was previously believed that the circuitry required to access stored subarrays is quite complicated unless $p,q$, and the number of memory modules are all powers of two, and hence that at least $2pq$ memory modules are required. Copending application Ser. No. 554,782, filed Mar. 3, 1975 now U.S. Pat. No. 3,995,253, discloses a memory system with precisely $2pq$ memory modules that permits access to all of the desired subarrays of I(*,*). The present invention describes a memory system that needs only $pq+1$ memory modules to provide access to all of these subarrays, namely, all $1 \times pq$ subarrays, all $pq \times 1$ subarrays, and all $p \times q$ subarrays.

SUMMARY OF THE INVENTION

It is accordingly an object of this invention to modify a conventional word organized random access memory for image processing operations so that it is capable of storing an image or partial image therein, and so that it permits access to sequences of image points along any row or column of the image array and to the image points within any rectangular area of this array.

More specifically, it is an object of this invention to modify a conventional word organized random access memory which stores an $rp \times sq$ or smaller image array so that any $pq \times 1$, $1 \times pq$ or $p \times q$ subarray of the image can be accessed (read or written) in a single memory cycle, $p$, $q$, $r$, and $s$ being design parameters.

The foregoing objects are believed satisfied by an apparatus for storing black/white images, which apparatus includes a novel accessing arrangement. The apparatus comprises memory means for storing the image points in the cells of $pq+1$ different memory modules, each module being an entity capable of storing $rs$ image points in distinguishable cells, only one cell of which is randomly accessible at a single instant of time. The apparatus further comprises means for extracting from the memory means horizontal or vertical linear sequences of length $pq$ or rectangular matrices of dimension $p \times q$, the starting point in the array for either sequence being arbitrary, and the starting point for matrices being arbitrary. The apparatus also comprises means for arranging the elements of the sequences or blocks accessed into row major order.

The disclosed apparatus includes $pq+1$ memory modules labeled 0, 1, . . ., $pq$, which modules can together store an $rp \times sq$ image array consisting of image points $I(i,j)$, where $i$ lies on the range $0 \leqq i < rp$ and $j$ lies on the range $0 \leqq j < sq$. The disclosed apparatus also includes routing means which cause image point $I(i,j)$ to be routed to or from memory module $M(i,j) = \lambda (iq+j)//(pq+1)$, where the notation "//" denotes the remainder resulting from integer division. The disclosed apparatus in addition includes address calculation means which, in conjunction with the routing means, causes image point $I(i,j)$ to be stored into or retrieved from location $A(i,j) = (i/p)s + (j/q)$ of memory module $M(i,j)$. The disclosed apparatus also includes control means which achieves simultaneous storage or retrieval of the $pq$ image points in any $1 \times pq$, $pq \times 1$ or $p \times q$ subarray of the image array.

BRIEF DESCRIPTION OF THE DRAWINGS

FIG. 1 shows the architecture of a word organized memory modified according to the invention.

FIGS. 2a and 2b show specific embodiments of the logic circuits required for the modulo-$(pq+1)$ operations for the case where $p=q=4$;

DESCRIPTION OF THE PREFERRED EMBODIMENT

Figure 3:
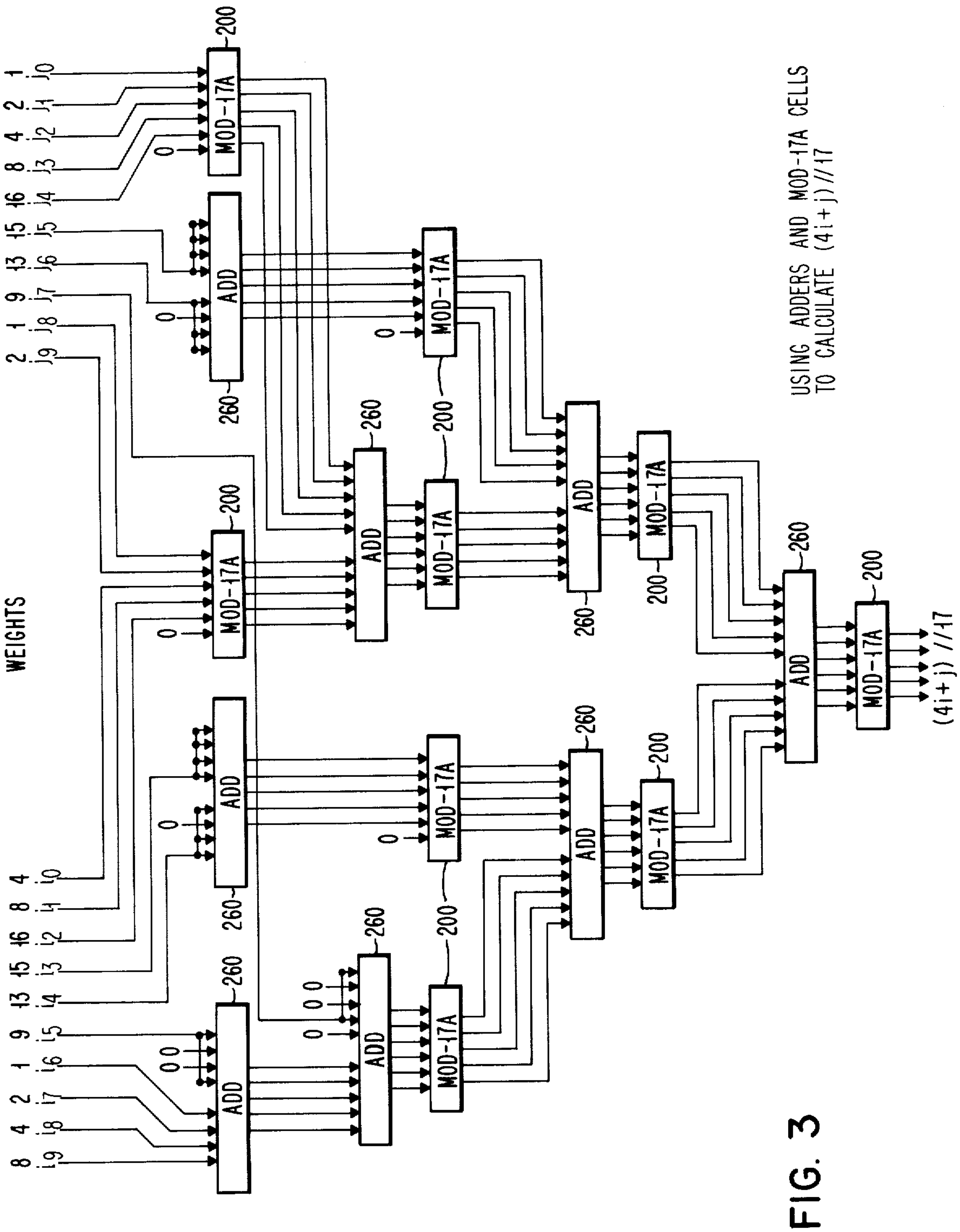
FIG. 3 shows schematic block diagrams of two specific embodiments of logic circuits capable of performing the modulo $-$ $(pq+1)$ operation $x//(pq+1)$ for the case where $p=q=4$ and $0 \leqq x \leqq 2pq+1$.

Referring now to FIG. 1, there is shown the architecture for the modified word organized random access memory. The apparatus includes $pq+1$ memory modules 20, 21, 22. Each module is able to store $rs$ image points. This means that each module can store $rs$ bits of information. Address, control, and enable circuitry 23 permits these modules to store any $rp \times sq$ (or smaller) image array I(*,*), and to access any $1 \times pq$, $pq \times 1$ or $p \times q$ subarray of I(*,*). A data register 24 is provided to hold any of these $pq$-element subarrays prior to storage or following retrieval of the image information from the memory modules. Also included are permuters 25 and 26. Permuters generally are specialized circuits for rearranging data. In the context of this invention, permuters 25 and 26, respectively, route elements of the subarrays to and from the appropriate memory modules for storage and retrieval. Control of the permuters is resident in the address, control, and enable circuitry 23 and connectable thereto over path 27.

When a particular subarray is to be stored in the memory system, the contents of registers 28, 29 and 30 are used to determine the subarray shape and the coordinates $(i,j)$ of the upper lefthand corner of the array as a reference point or base address. Thus, the two bit $t$ register 28 is set to one of the values $t=00$, $t=01$, or $t=10$, in order to indicate respectively, that the subarray shape is $1 \times pq$, $pq \times 1$, or $p \times q$. The $i$ and $j$ registers 29 and 30 are set to indicate coordinates of the upper lefthand element $I(i,j)$ of the subarray. The subarray itself is placed in data register 24 in row major order, such that $I(i,j)$ is in the leftmost position of the register. The subarray elements are provided to permuter 25 via lines 31, 32 and 33. Based upon the values of $t$, $i$ and $j$, the control portion of address, control, and enable circuitry 23 causes permuter 25 to route each element of the subarray over counterpart lines 34, 35 and 36 to the module within which it is to be stored. The address portion of address, control, enable circuitry 23 calculates its location within that module. The addresses are provided to the modules by lines 37, 38 and 29. The enable portion of the address control and enable circuitry 23 provides enabling signals to the $pq$ memory modules that are to store the subarray. These enabling signals are provided over lines 40, 41 and 42 to AND gates 43, 44 and 45 associated with counterpart memory modules 20, 21 and 22. Finally, a write signal provided on lines 46 from an external read/write control source 47 causes the $pq$ elements of the subarray to be stored simultaneously in the $pq$ enabled memory modules.

When a particular subarray is to be retrieved from the memory system, the $t$, $i$ and $j$ registers are set as described above to indicate the shape of the subarray and to identify its upper lefthand element. The enable portion of the address, control, and enable circuitry 23 enables the $pq$ memory modules that contain elements of the desired subarray. The address portion of the address, control, and enable circuitry 23 uses the values of $t$, $i$ and $j$ in order to calculate for each enabled memory module the location of the unique element of the subarray which it contains. After the calculations are made, a read signal from read/write control source 47 on lines 46 causes the $pq$ elements of the subarray to be retrieved from the enabled modules and routed via lines 48, 49 and 50 to permuter 26. The control portion of the address, control, and enable circuitry 23 causes permuter 26 to arrange the elements of the subarray in row major order and to route them to data register 24 over lines 51, 52 and 53.

Whenever a $1 \times pq$, $pq \times 1$, or $p \times q$ subarray of I(*,*) is retrieved from or stored into the memory system, the enable portion of the address, control and enable circuitry 23 must calculate for $0 \leqq k < q$, a Boolean value $b(i,j,k,t)$ that indicates whether the $k$th memory module is to supply or accept a subarray element. The address portion of the address, control, and enable circuitry 23 must calculate for $k$ in the range $0 \leqq k < pq$, the location $1(i,j,k,t)$ of the unique element $e(i,j,k,t)$ of the subarray either contained by or to be placed in the $k$th memory module. The control portion of the address, control, and enable circuitry 23 must, in combination with permuters 25 and 26, arrange for element $e(i,j,k,t)$ to be routed to or from the appropriate position in register 24. Table 1 summarizes the calculations and the routing patterns required for access to a subarray whose upper lefthand element is image point $I(i,j)$. The calculations of the enabling function $b(i,j,k,t)$ and the address function $1(i,j,k,t)$ require the prior calculation of two auxiliary functions, $g(i,j,k,t)$ and $h(i,j,k,t)$. The routing pattern specification indicates which of the $pq$ positions $d(0), d(1), \ldots, d(pq-1)$ of data register 24 is to receive or supply element $e(i,j,k,t)$ contained (or to be placed) in module $k$.

Exemplary circuitry implementing the above calculations and routing patterns is amply set forth in FIGS. 3-10 which are described below. Of course, it should be understood that alternative circuitry, for example, circuitry based upon table lookup, could be designed to perform the same functions.

TABLE 1

| | | Algebraic Description of the Memory System | | |
|---|---|---|---|---|
| Subarray Shape | Shape Designator | Intermediate Calculations | b(i,j,k,t)<br>1(i,j,k,t) | Routing Pattern |
| $1 \times pq$ | t=00 | $\mu-(iq+j)//(pq+1)$<br>$m=\mu$<br>$\gamma=(k-m)//(pq+1)$<br>$\beta=\gamma\ \alpha=0$ | $b=LT(\gamma,pq)$<br><br>$1=([+\alpha])/p)s+(j+\beta)/q$ | $e(i,j,k,t)\rightleftarrows d(\gamma)$ |
| $pq \times 1$ | t=01 | $\mu=(iq+j)//(pq+1)$<br>$m=(-p\mu)//(pq+1)$<br>$\gamma=(-p\mu-m)//(pq+1)$<br>$\alpha=\gamma$<br>$\beta=0$ | $b=LT(\gamma,pq)$<br><br>$1=([i+\alpha]/p)s+(j+\beta)/q$ | $e(i,j,k,t)\rightleftarrows d(\gamma)$ |
| $p \times q$ | t=10 | $\mu=(iq+j)//(pq+1)$<br>$m=\mu$<br>$\gamma=(k-m)//(pq+1)$<br>$\beta=\gamma//q$<br>$\alpha=\gamma/q$ | $b=LT(\gamma,pq)$<br><br>$1([i+\alpha]/p)s+(j+\beta)/q$ | $e(i,j,k,t)\rightleftarrows d(\gamma)$ |

The calculations and routing patterns noted above are based upon a predetermined distribution of image points among the $pq+1$ memory modules. Before describing the preferred embodiments, appreciation of the true nature and scope of the invention will be enhanced by first considering the justification for the chosen distribution strategy.

Distribution Strategy

As stated previously, it is an object of the invention to construct a memory system capable of storing an $rp \times sq$ image array I(*,*) consisting of image points $I(i,j)$, where $i$ lies in the range $0 \leqq i < rp$ and $j$ lies in the range $0 \leqq j < sq$. Furthermore, the memory system is required to store the image in a manner permitting access to all $1 \times pq$, $pq \times 1$, and $p \times q$ subarrays of I(*,*).

If the memory system outlined in FIG. 1 is to store the image array I(*,*), then for each image point $I(i,j)$ it is necessary to determine which of the $pq+1$ memory modules 20, 21 or 22 should store $I(i,j)$. It was observed that when memory modules were assigned the memory module numbers $0, 1, \ldots, pq$ as indicated in FIG. 1, the distribution of image points among the memory modules could be described succinctly by specifying an integer-valued module assignment function $M(k,j)$ with the following characteristic:

for any integers $i$ and $j$ on the range $0 \leqq i < rp$ and $0 \leqq j < sq$, the value of $M(i,j)$ lies in the range $0 \leqq M(i,j) < pq$.

Each image point $I(i,j)$ is then stored in the $M(i,j)$th memory module.

If the memory system outlined in FIG. 1 is to store the image array I(*,*) in a manner permitting simultaneous access to the $pq$ image points in any $1 \times pq$ subarray of I(*,*), then these image points must be stored in different memory modules. This is because only one storage cell of each memory module is randomly accessible at a single instant of time. Similarly, if the memory system in FIG. 1 is to permit simultaneous access to the $pq$ image points in any $pq \times 1$ subarray of I(*,*), or in any $p \times q$ subarray of I(I,*), then these image points must also be stored in different memory modules.

It was unexpectedly observed that if the module assignment function $M(i,j)$ assumed the form $M(i,j)=\lambda(iq+j)//(pq+1)$ where the notation "//" denotes the remainder of integer division, then the $pq$ image points of every $1 \times pq$ subarray, every $pq \times 1$ subarray and every $p \times q$ subarray would be stored in different memory modules. This would permit simultaneous accessing of the $pq$ image points in the desired subarrays.

The module assignment function $M(i,j)=\lambda(iq+j)//(pq+1)$ is illustrated in Table 2 for the case that $p=q=4$, $r=s=8$. The decimal number in the $j$th position of the $i$th row of the 32 × 32 array in Table 2 denotes the memory module $M(i,j)$ for storing image point $I(i,j)$. In this table the letters A–G represent, respectively the decimal integers 10–16 for example, the circled entry in the 6th position of the 5th row is 9, which indicates that the image point I(5,6) is stored in the 9th memory module. This may be calculated as $$M(i,j)=M(6,5)=(iq+j)//(pq+1)$$
$$=([5\times4]+6)//([4\times4]+1)$$
$$=(20+6)//(16+1)$$
$$=(26)//(17)$$
$$=9$$

$rs$ image points to each of the $pq$ memory modules without specifying the cell locations in which they are to be stored. It was unexpectly observed that the image points could be conveniently stored in location $A(i,j)$ of memory module $M(i,j)$ if such a function varied according to the form $A(i,j)=(i/p)s+(j/q)$ where $i/p$ and $j/q$ are integer quotients.

The address addignment function $A(i,j)$ is illustrated in Table 3 for the case that $p=q=4$, $r=s=8$. The decimal integer within each $p \times q$ = 4 × 4 block indicates the address of the corresponding $pq$ = 16 image points. For example, the fifth position on the tenth row falls in the 4 × 4 block labeled with decimal 17. This indicates

TABLE 2

The moldule Assignment Function M(i,j) = (iq+j)//(pq+1) for the case that p=q=4 and r=s=8.

| | j =0 | | | | 4 | | | | 8 | | | | 12 | | | | 6 | | | | 20 | | | | 24 | | | | 28 |
|---|---|---|---|---|---|---|---|---|---|---|---|---|---|---|---|---|---|---|---|---|---|---|---|---|---|---|---|---|---|
| 1=0 | 0 | 1 | 2 | 3 | 4 | 5 | 6 | 7 | 8 | 9 | A | B | C | D | E | F | G | 0 | 1 | 2 | 3 | 4 | 5 | 6 | 7 | 8 | 9 | A | BCDE |
| | 4 | 5 | 6 | 7 | 8 | 9 | A | B | C | D | E | F | G | 0 | 1 | 2 | 3 | 4 | 5 | 6 | 7 | 8 | 9 | A | B | C | D | E | FG01 |
| | 8 | 9 | A | B | C | D | E | F | G | 0 | 1 | 2 | 3 | 4 | 5 | 6 | 7 | 8 | 9 | A | B | C | D | E | F | G | 0 | 1 | 2345 |
| | C | D | E | F | G | 0 | 1 | 2 | 3 | 4 | 5 | 6 | 7 | 8 | 9 | A | B | C | D | E | F | G | 0 | 1 | 2 | 3 | 4 | 5 | 6789 |
| 4 | G | 0 | 1 | 2 | 3 | 4 | 5 | 6 | 7 | 8 | 9 | A | B | C | D | E | F | G | 0 | 1 | 2 | 3 | 4 | 5 | 6 | 7 | 8 | 9 | ABCD |
| | 3 | 4 | 5 | 6 | 7 | 8 | 9 | A | B | C | D | E | F | G | 0 | 1 | 2 | 3 | 4 | 5 | 6 | 7 | 8 | 9 | A | B | C | D | EFG0 |
| | 7 | 8 | 9 | A | B | C | D | E | F | G | 0 | 1 | 2 | 3 | 4 | 5 | 6 | 7 | 8 | 9 | A | B | C | D | E | F | G | 0 | 1234 |
| | B | C | D | E | F | G | 0 | 1 | 2 | 3 | 4 | 5 | 6 | 7 | 8 | 9 | A | B | C | D | E | F | G | 0 | 1 | 2 | 3 | 4 | 5678 |
| 8 | F | G | 0 | 1 | 2 | 3 | 4 | 5 | 6 | 7 | 8 | 9 | A | B | C | D | E | F | G | 0 | 1 | 2 | 3 | 4 | 5 | 6 | 7 | 8 | 9ABC |
| | 2 | 3 | 4 | 5 | 6 | 7 | 8 | 9 | A | B | C | D | E | F | G | 0 | 1 | 2 | 3 | 4 | 5 | 6 | 7 | 8 | 9 | A | B | C | DEFG |
| | 6 | 7 | 8 | 9 | A | B | C | D | E | F | G | 0 | 1 | 2 | 3 | 4 | 5 | 6 | 7 | 8 | 9 | A | B | C | D | E | F | G | 0123 |
| | A | B | C | D | E | F | G | 0 | 1 | 2 | 3 | 4 | 5 | 6 | 7 | 8 | 9 | A | B | C | D | E | F | G | 0 | 1 | 2 | 3 | 4567 |
| 12 | E | F | G | 0 | 1 | 2 | 3 | 4 | 5 | 6 | 7 | 8 | 9 | A | B | C | D | E | F | G | 0 | 1 | 2 | 3 | 4 | 5 | 6 | 7 | 89AB |
| | 1 | 2 | 3 | 4 | 5 | 6 | 7 | 8 | 8 | A | B | C | D | E | F | G | 0 | 1 | 2 | 3 | 4 | 5 | 6 | 7 | 8 | 9 | A | B | CDEF |
| | 5 | 6 | 7 | 8 | 9 | A | B | C | D | E | F | G | 0 | 1 | 2 | 3 | 4 | 5 | 6 | 7 | 8 | 9 | A | B | C | D | E | F | G012 |
| | 9 | A | B | C | D | E | F | G | 0 | 1 | 2 | 3 | 4 | 5 | 6 | 7 | 8 | 9 | A | B | C | D | E | F | G | 0 | 1 | 2 | 3456 |
| 16 | D | E | F | G | 0 | 1 | 2 | 3 | 4 | 5 | 6 | 7 | 8 | 9 | A | B | C | D | E | F | G | 0 | 1 | 2 | 3 | 4 | 5 | 6 | 789A |
| | 0 | 1 | 2 | 3 | 4 | 5 | 6 | 7 | 8 | 9 | A | B | C | D | E | F | G | 0 | 1 | 2 | 3 | 4 | 5 | 6 | 7 | 8 | 9 | A | BCDE |
| | 4 | 5 | 6 | 7 | 8 | 9 | A | B | C | D | E | F | G | 0 | 1 | 2 | 3 | 4 | 5 | 6 | 7 | 8 | 9 | A | B | C | D | E | FG01 |
| | 8 | 9 | A | B | C | D | E | F | G | 0 | 1 | 2 | 3 | 4 | 5 | 6 | 7 | 8 | 9 | A | B | C | D | E | F | G | 0 | 1 | 2345 |
| 20 | C | D | E | F | G | 0 | 1 | 2 | 3 | 4 | 5 | 6 | 7 | 8 | 9 | A | B | C | D | E | F | G | 0 | 1 | 2 | 3 | 4 | 5 | 6789 |
| | G | 0 | 1 | 2 | 3 | 4 | 5 | 6 | 7 | 8 | 9 | A | B | C | D | E | F | G | 0 | 1 | 2 | 3 | 4 | 5 | 6 | 7 | 8 | 9 | ABCD |
| | 3 | 4 | 5 | 6 | 7 | 8 | 9 | A | B | C | D | E | F | G | 0 | 1 | 2 | 3 | 4 | 5 | 6 | 7 | 8 | 9 | A | B | C | D | EFG0 |
| | 7 | 8 | 9 | A | B | C | D | E | F | G | 0 | 1 | 2 | 3 | 4 | 5 | 6 | 7 | 8 | 9 | A | B | C | D | E | F | G | 0 | 1234 |
| 24 | B | C | D | E | F | G | 0 | 1 | 2 | 3 | 4 | 5 | 6 | 7 | 8 | 9 | A | B | C | D | E | F | G | 0 | 1 | 2 | 3 | 4 | 5678 |
| | F | G | 0 | 1 | 2 | 3 | 4 | 5 | 6 | 7 | 8 | 9 | A | B | C | D | E | F | G | 0 | 1 | 2 | 3 | 4 | 5 | 6 | 7 | 8 | 9ABC |
| | 2 | 3 | 4 | 5 | 6 | 7 | 8 | 9 | A | B | C | D | E | F | G | 0 | 1 | 2 | 3 | 4 | 5 | 6 | 7 | 8 | 9 | A | B | C | DEFG |
| | 6 | 7 | 8 | 9 | A | B | C | D | E | F | G | 0 | 1 | 2 | 3 | 4 | 5 | 6 | 7 | 8 | 9 | A | B | C | D | E | F | G | 0123 |
| 28 | A | B | C | D | E | F | G | 0 | 1 | 2 | 3 | 4 | 5 | 6 | 7 | 8 | 9 | A | B | C | D | E | F | G | 0 | 1 | 2 | 3 | 4567 |
| | E | F | G | 0 | 1 | 2 | 3 | 4 | 5 | 6 | 7 | 8 | 9 | A | B | C | D | E | F | G | 0 | 1 | 2 | 3 | 4 | 5 | 6 | 7 | 89AB |
| | 1 | 2 | 3 | 4 | 5 | 6 | 7 | 8 | 9 | A | B | C | D | E | F | G | 0 | 1 | 2 | 3 | 4 | 5 | 6 | 7 | 8 | 9 | A | B | CDEF |
| | 5 | 6 | 7 | 8 | 9 | A | B | C | D | E | F | G | 0 | 1 | 2 | 3 | 4 | 5 | 6 | 7 | 8 | 9 | A | B | C | D | E | F | G012 |

It should be readily observed from Table 2 that the $pq=16$ image points in any $1 \times pq = 1 \times 16$ subarray are stored in different memory modules. For example, the 16 element horizontal sequence indicated in Table 2 shows that the image points I(5,6),I(5,7), . . .,I(5,21) are stored respectively in memory modules, 9,A,B,C,-D,E,F,G,0,1,2,3,4,5,6 and 7. Also it will be observed from Table 2 that the $pq=16$ elements of any $pq \times 1 = 16 \times 1$ subarray are stored in different memory modules. For example, the vertical sequence indicated shows that the image points I(5,6),I(6,6), . . .,I(20,6) are stored respectively, in memory modules 9,E,0,4,8,C,G,3,7,B,F,2,6,A,E and 1. Finally, it will be observed from Table 2 that the $pq=16$ image points in any $p \times q = 4 \times 4$ subarray are stored in different memory modules. For example, the 4 × 4 block indicated in Table 2 identifies the memory module assignments for the image points in the 4 × 4 subarray whose upper lefthand element is the image point I(5,6).

The above module assignment function $M(i,j)$ assigns that image point I(10,5) is stored in the 17th cell of memory module M(10,5). This may be calculated as $$A(i,j)=A(10,5)=(i/p)s+(j/q)$$
$$=(10/4)8+(5/4)$$
$$=(2)8+(1)$$
$$=17$$

TABLE 3

The Address Assignment Function (A/i,j) = (i/p)s + j/q for the case that p=q=4 and r=s=8.

| | j=0 | 4 | 8 | 12 | 16 | 20 | 24 | 28 |
|---|---|---|---|---|---|---|---|---|
| 1=0 | 0 | 1 | 2 | 3 | 4 | 5 | 6 | 7 |
| 4 | 8 | 9 | 10 | 11 | 12 | 13 | 14 | 15 |
| 8 | 16 | 17 | 18 | 19 | 20 | 21 | 22 | 23 |
| 12 | 24 | 25 | 26 | 27 | 28 | 29 | 30 | 31 |
| 16 | 32 | 33 | 34 | 35 | 36 | 37 | 38 | 39 |
| 20 | 40 | 41 | 42 | 43 | 44 | 45 | 46 | 47 |
| 24 | 48 | 49 | 50 | 51 | 52 | 53 | 54 | 55 |
| 28 | 56 | 57 | 58 | 59 | 60 | 61 | 62 | 63 |

STRUCTURAL DESIGN

As indicated by the algebraic description in Table 1, the address, control, and enable circuitry 23 for the disclosed memory system must perform a number of modulo-$(pq+1)$ operations. The combinational circuitry for these calculations can be separated into several special cases, which are considered separately below.

Case 1: Evaluate $x//(pq+1)$ for $x \epsilon [0,2pq+1]$.

This calculation, which is required for the evaluation of $(iq+j)//(pq+1)$ described by Case 2 below, can be achieved according to the identity $$x//(pq+1) = x - (pq+1) \cdot LT(x-[pq+1],0).$$

(note: The Boolean "less than function" LT(.,.) is defined by the related LT(4,3)=1 if and only if $y < z$.) FIGS. 2(*a*) and 2(*b*) illustrate the use of an adder or a half-adder to calculate $x//(pq+1)$ when $x \leqq 33$ and $p = q = 4$.

Referring now to FIG. 2(*a*), there is shown circuitry for performing the module 17 operation $x//17 = x - (17) \cdot LT(x-17,0)$, when $x$ is a six bit binary number satisfying $0 \leqq x \leqq 33$. The modulo 17 circuitry comprises essentially: three circuits (OR circuit 208, AND circuit 210, and OR circuit 216) for determining whether $x \geqq 17$, i.e., whether the Boolean value $LT(x-17,0)$ is false; an adder 202 for calculating $x-17$ when necessary, by adding to $x$ the binary representation 01111 of the value $-17$; and four circuits (inventor 214, AND circuits 204 and 212, and OR circuit 206) for identifying the two special situations ($x=33$ and $x=16$) under which $x//17=16$.

As indicated in FIG. 2(*a*), six input lines are provided at the top of the block for the value $x$. The low order four bits of $x$ are supplied to OR circuit 208 and to adder 202, the fifth order bit of $x$ is supplied to AND circuits 210 and 212, and the high order bit of $x$ is combined with the low order bit of $x$ in AND circuit 204. The output of OR circuit 208 is combined with the fifth order bit of $x$ in AND circuit 210 to produce an output which is true whenever $x=17$, 18, 19, 20, 21, 22, 23, 24, 25, 26, 27, 28, 29, 30, or 31. The output of AND circuit 210 is then combined with the high order bit of $x$ at OR circuit 216 to produce an output which is true whenever $x \geqq 17$, i.e., whenever the Boolean value $LT(x-16,0)$ is false. The output of OR circuit 216 serves as the second input to adder 202.

The output of OR circuit 208 is negated by inverter 214 and combined with the fifth order bit of $x$ in AND circuit 212 to produce an output which is true only when $x=16$. The output of AND circuit 204 is true only when $x=33$. OR circuit 206 combines the outputs of AND circuits 212 and 204, and thus the output of OR circuit 206 is true only if $x=16$ or $x=33$, so that the desired modulo $-17$ remainder of $x$ is 16.

When $p$ and $q$ are both powers of 2, the adder 202 can be replaced by a half-adder 218 as shown in FIG. 2(*b*) with the addition of inverters 220. The circuit operates substantially the same as the circuit of FIG. 2(*a*) to produce the modulo-17 remainder of the $x$ input to the cell 200. Either of these circuits is suitable for the MOD-17A cell used in FIG. 8.

Case 2: Evaluate $(iq+j)//(pq+1)$

This is the only difficult modulo-$(pq+1)$ calculation required for the disclosed memory system. Fortunately, $(iq+j)//(pq+1)$ is an intermediate value that only has to be calculated once. The hardware calculation of $(iq+j)//(pq+1)$ is based on the observation that this quantity can be expressed as a simple function of the binary digits in the binary representations of $i$ and $j$. If these binary representations are $i_m \ldots i_1 i_0$ and $j_n \ldots j_1 j_0$, respectively, then $$(iq+j)//(pq+1) = \left\{ \Sigma_{t=0}^{m} i_t q 2^t + \Sigma_{t=0}^{n} j_t 2^t \right\} //(pq+1)$$

$$= \left\{ \Sigma_{t=0}^{m} i_t [q2^t//(pq+1)] + \Sigma_{t=0}^{n} j_t [s^t//(pq+1)] \right\} //(pq+1).$$

In this last formula, the quantities $i_t$ and $j_t$ are Boolean variables, while the quantities $q2^t//(pq+1)$ and $2^t//(pq+1)$ are constant "weights" that can be hardwired. Hence, as illustrated in FIG. 3 for the case $p=q=4$ and $r=s=256$, $(iq+j)//(pq+1)$ can be calculated by a cascade of adders 260, interspersed with MOD-17A cells 20 that perform the basic modulo-$(pq+1)$ calculation described for Case 1. In FIG. 3 the weights $4.2^t//17$ and $2^t//17$ are indicated over the corresponding digits $i_t$ and $j_t$ and the output $(4i+j)//17$ is provided.

Figure 4:
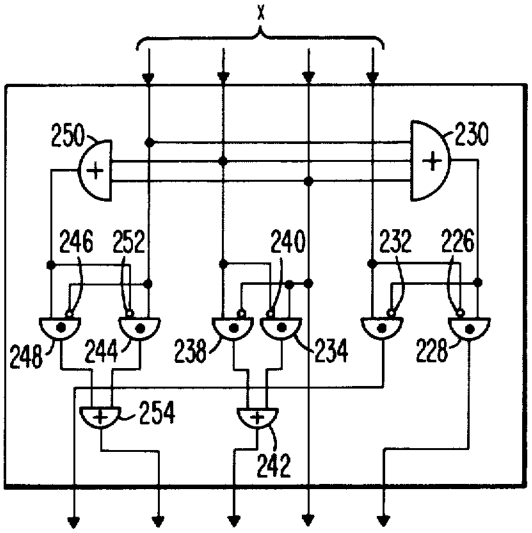
FIG. 4 shows a schematic diagram of a specific embodiment of logic circuits capable of performing the modulo$-(pq+1)$ operation $xpq//(pq+1)$ for the case where $p=q=4$ and $0 \leqq x \leqq pq-1$.
Figure 5:
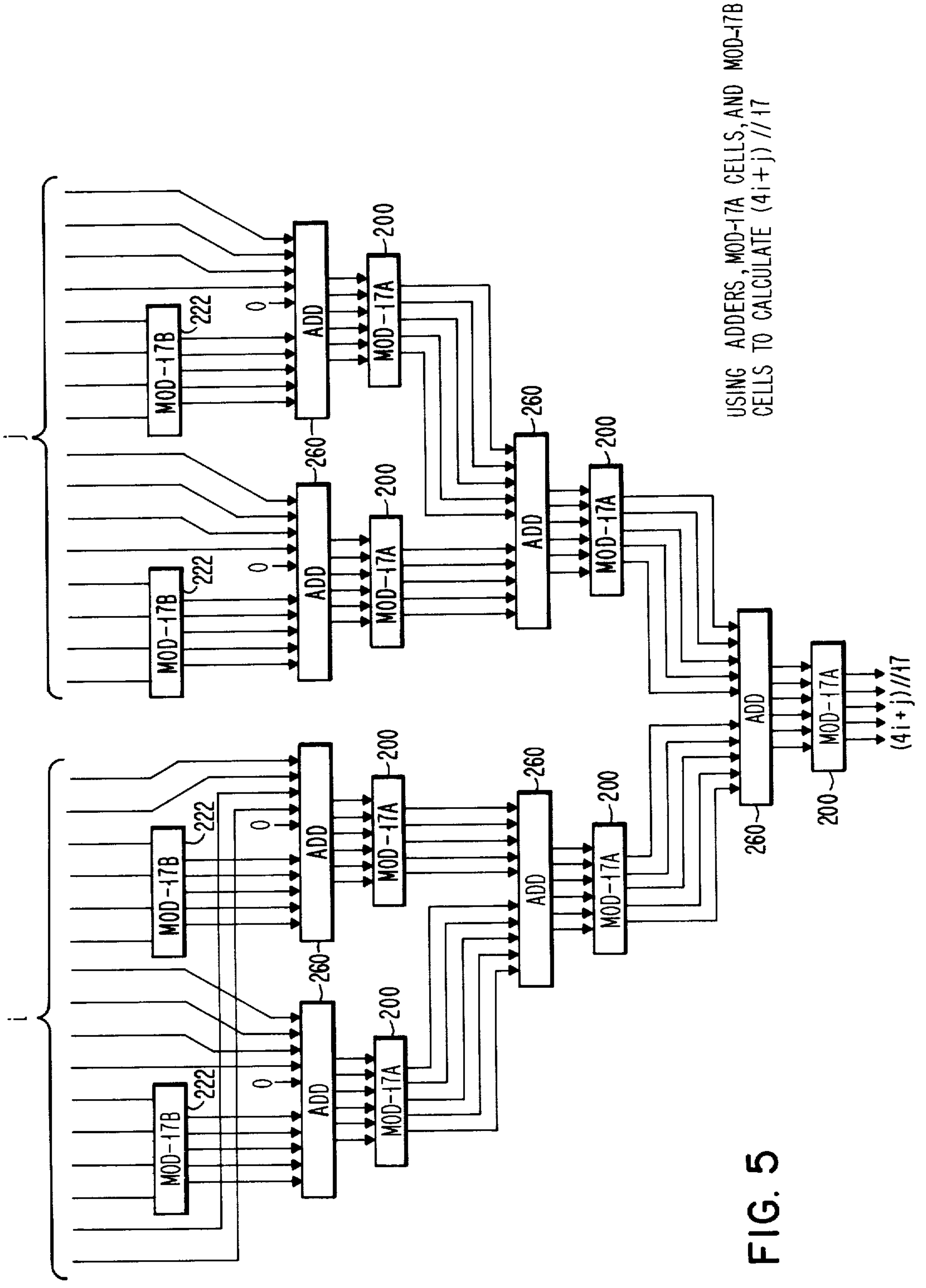
FIG. 5 is a schematic block diagram of a specific embodiment of the logic circuits required to calculate $(iq+j)//(pq+1)$ using conventional adders in conjunction with the circuits of FIGS. 3 and 4.

The approach illustrated in FIG. 3 for calculating $(iq+j)//(pq+1)$ can be simplified somewhat by using combinational circuitry in place of some of the adders. This change is shown in FIG. 4 which shows a simple combinational circuit denoted the MOD-17B cell 222 for calculating $16 \times //17$, and FIG. 5 shows the use of this MOD-17B cell 222 for calculating $(iq+j)//(pq+1)$ when $p=q=4$ and $r=s=8192$. The circuit shown in FIG. 5 is capable of calculating $(4i+j)//17$ for much larger $i$ and $j$ numbers. This circuit comprises a cascade of adders 260 and MOD-17B cells 222 followed by a further cascade of MOD-17A cells 200 and adders 260. This organization is also used by circuit 130 in FIG. 7 for calculating $\mu=(iq+j)$ 11$(pq+1)$ when $p=q=4$ and $r=s=8$.

Referring now to FIG. 4, there is shown circuitry for performing the modulo-17 operation $16x//17$, when $x$ is a 4-bit binary integer satisfying $0 \leqq x \leqq 15$. As indicated, four input lines are provided at the top of the block for the value $x$.

The low order bit of $x$ is coupled as an input to AND circuit 224 and through inverter 226 to one input of AND circuit 228. The three high order bits of $x$ are coupled as inputs to OR circuit 230. The output of OR circuit 230 is coupled as an input to AND circuit 228 and through inverter 232 to AND circuit 224. The output of AND circuit 228 forms the low order output from the cell, and the output from AND circuit 224 forms the high order output from the cell. The second order bit of $x$ forms the second order output signal from the cell and is coupled as an input to AND circuit 234 and through inverter 236 to AND circuit 238. The third order bit of $x$ is coupled as an input to AND circuit 238 and through inverter 240 to AND circuit 234. The output of AND circuits 234 and 238 are coupled as inputs to OR circuit 242 and the output of OR circuit 242 provides the third order output signal from the cell.

The high order bit of $x$ is coupled as an input to AND circuit 244 through inverter 246 to AND circuit 248. The second and third order bits of $x$ are coupled as inputs to OR circuit 250. The output of OR circuit 250 is coupled as an input to AND circuit 248 and through inverter 252 to AND circuit 244. The output of AND circuits 244, and 248 are coupled as inputs to OR circuit 254 and the output of OR circuit 254 provides the fourth order output signal from the cell.

Case 3: Evaluate $(-px)//(pq+1)$ for $x \in [0,pq]$.

This calculation, which is required for accesses to $pq \times 1$ subarrays, can be achieved according to the identity $$(-px)//(pq+1) = p[(-x)//q] + EQ(x//q,0) + x/q.$$

(Note: The boolean "equality function" EQ(.,.) is defined by the relation $EQ(x,y)=1$ if and only if $x=y$.) As illustrated by circuit 131 in FIG. 7 for the case $p=q=4$, a few gates and one half-adder suffice for this calculation.

Case 4: Evaluate $(x-y)//(pq+1)$ for $x \in [0,pq]$.

This calculation, which is required for all $pq+1$ address calculations, can be achieved according to the identity $$(x-y)//(pq+1) = x-y+(pq+1)\,LT(x,y).$$

Figure 8:
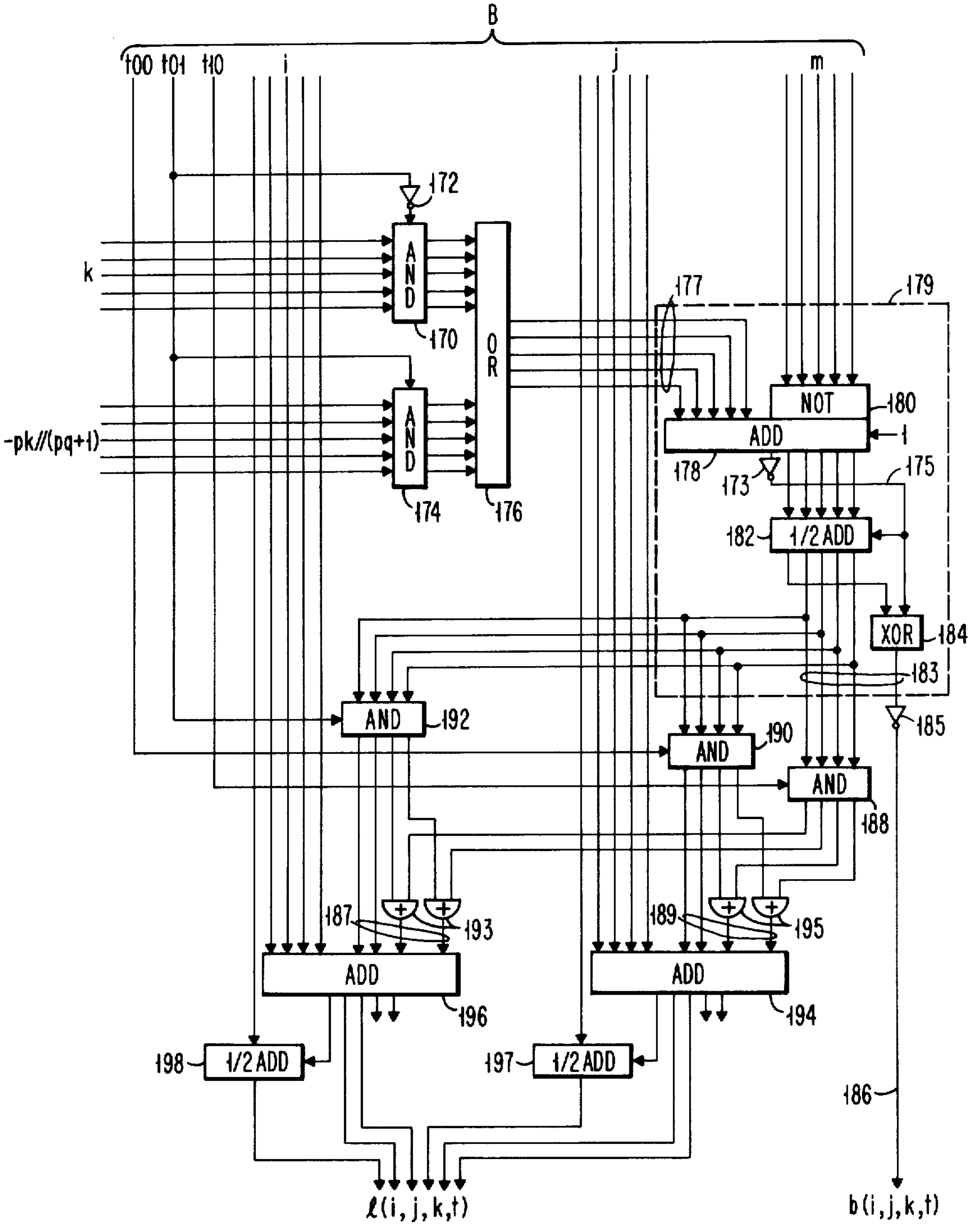
FIG. 8 shows detailed logical design of the module logic shown in FIG. 6.

As illustrated by circuit 179 in FIG. 8 for the case $p=q=4$, a few gates, one adder, and one half-adder suffice for this calculation.

Figure 6:
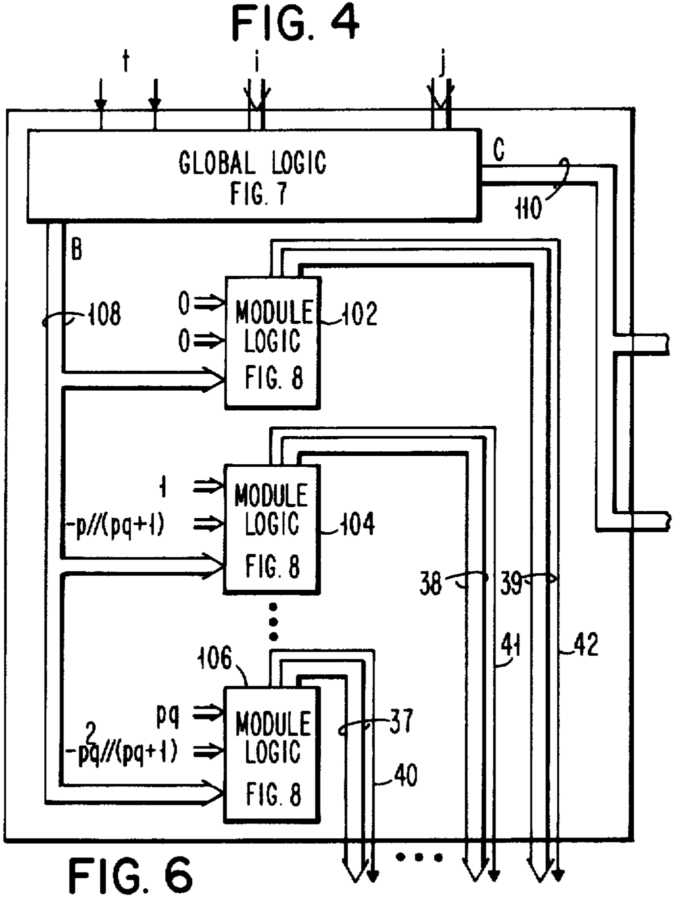
FIG. 6 shows the selective logical details of the address, control, and enable circuitry set forth in FIG. 1.

Referring now to FIG. 6, there is provided an overview of the address, control, and enable circuit 23 shown in FIG. 1. As indicated in FIG. 6, the address, control, and enable circuitry 23 comprises: a single global logic component 100 and $pq+1$ identical module logic components 102, 104 and 106.

The global logic component 100 operates in response to the subarray shape designation $t$ in register 28, and to the subarray starting coordinates $i$ and $j$ in register 29 and 30 to calculate the quantities B and C. The quantity B is supplied over lines 108 for control of the module logic components 102, 104 and 106. The quantity C is supplied over lines 110 for control of permuters 25, 26.

The module logic components 102, 104 and 106 operate in response to the values calculated by the global logic component and provided over lines 108. These module logic components calculate cell addresses and enabling signals for their associated memory modules. In particular, the cell address $1(i,j,k,t)$ and the enabling signal $b(i,j,k,t)$ are calculated for the $k$th memory module. The cell addresses are supplied to the respective memory modules over lines 37, 38 and 39 and the enabling signals are supplied over lines 40, 41 and 42.

Figure 7:
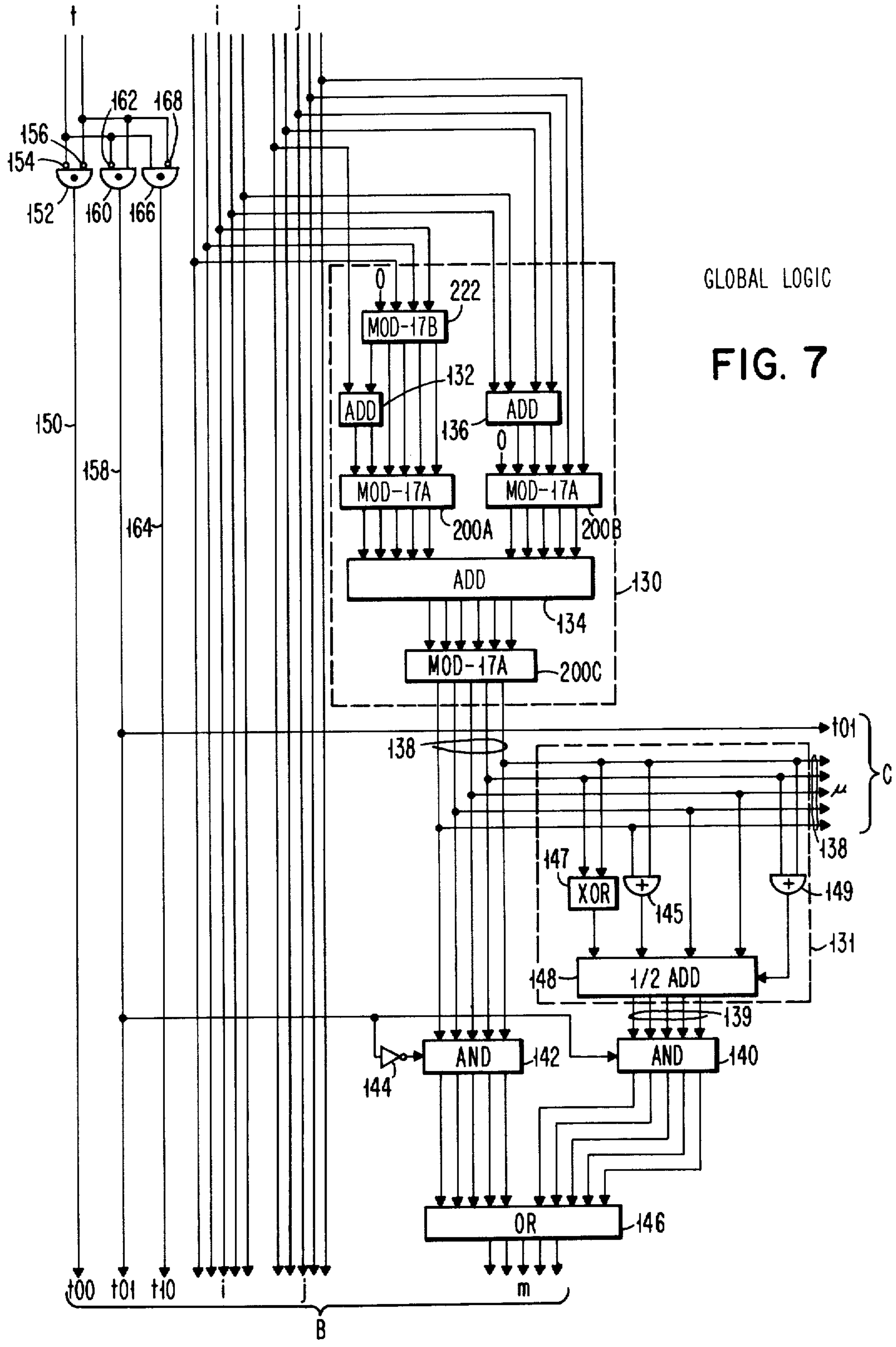
FIG. 7 shows the detailed logic design of the global logic shown in FIG. 6.

Referring now to FIG. 7, there is provided a detailed description of the global logic component 100 shown in FIG. 6. The inputs to this component are the subarray shape designation $t$ and the subarray starting coordinates $i$ and $j$. The outputs from this circuit are the quantities B and C. The global logic component 100 operates on the subarray location and shape designation $i$, $j$ and $t$ to calculate control values C used to control the operation of routing circuits 25, 26. Also, the global logic component 100 calculates intermediate values B used by all the module logic components 102, 104 and 106. As indicated in FIG. 7, each of these quantities B and C comprises a bundle of signals. B consists of $t00$, $t01$, $i$, $j$ and $m$, while C consists of the values $t01$ and $\mu$. Each of these values is calculated according to the formulas provided in Table 1.

The first three values calculated by the global logic component are the quantities $t00$, $t01$ and $t10$. The quantity $t00$ is a Boolean value which is true if the input $t$ has the value $t=00$. This can be written symbolically as $t00=EQ(t,00)$. The quantity $t00$ is provided on line 150 by AND gate 154 operating in conjunction with INVERTERS 154, 156. Similarly, the quantity $t01=EQ(t,01)$ is provided on line 158 by AND gate 160 and INVERTER 162. The quantity $t10=EQ(t,10)$ is provided on line 164 by AND gate 166 and INVERTER 168.

The next value to be calculated by the global logic component is the quantity $\mu=(iq+j)//(pq+1)$. That is, $\mu$ is the quantity that results from the integer division of $(iq+j)$ by $(pq+1)$. The circuit 130 for calculating $\mu$ comprises a MOD-17B cel 222 which the high order three bits of $i$ are coupled. A 0 is coupled to the high order input to the cell. The high order output bit is combined in adder 132 with the high order bit of $j$. Adder 132 and the MOD-17B cell supply the inputs to a MOD-17A cell 200A cell. The low order two bits of the $i$ input are combined in adder 136 with third and fourth order bits from the $j$ input. Adder 136 provides three inputs to a second MOD-17A cell 200B. A zero provides the high order bit input to the MOD-17A cell 200B and the low order two bits of $j$ provide the other two inputs to this cell. Adder 134 combines the outputs of MOD-17A cells 200A and 200B. The output of adder 134 is coupled to another MOD-17A cell 200C, the output of which on lines 138 comprises the value $\mu$. As been described, the value $\mu$ on lines 138 comprises part of the bundle of signals C. Additionally, the value $\mu$ is supplied to AND circuit 140 and to the circuit 131 that concludes $(-p\mu)//(pq+1)$.

The circuit 131 comprises EXCLUSIVE OR circuit 147, OR circuits 145 and 149, and half-adder 148 calculates the quantity $(-p\mu)//(pq+1)=p[(-\mu)//q]+\mu/q+EQ(\mu//q,0)$. This quantity is supplied via lines 139 to AND circuit 140.

The input $t01$ is coupled to AND circuit 140 and through inverter 144 to AND circuit 142. Thus, when $t=00$ or $t=10$, AND circuit 142 is conditioned and the value $\mu$ is provided through OR circuit 146 to provide the value $m$. As can be seen by reference to Table 1, $m=\mu$ for those $t$ inputs. Alternatively, when $t=01$, AND circuit 140 is conditioned and the quantity $(-p\mu)//(pq+1)$ is provided through OR circuit 146 to provide the value $m$. As can be seen by reference to Table 1, $m=(-p\mu)//(pq+1)$ when $t=01$.

Referring now to FIG. 8, there is provided a detailed description of one of the module logic components 100, 104 or 106 shown in FIG. 6. One group of inputs to the module logic component are the bundle of signals B calculated by the global logic component 100. Another input to the module logic component is an integer $k$, which designates the identity of the module to which the module logic component is attached. The final input to the module logic component is the quantity $(-pk)//(pq+1)$. The outputs from the module logic component are the memory location $1(i,j,h,t)$ and the enabling variable $b(i,j,b,t)$, which are calculated according to the formulas provided in Table 1.

The first quantity to be calculated by the module logic component is $\gamma$, which has the value $\gamma=(k-m)//(pq+1)=k-m+(pq+1)-\mathrm{LT}(k,m)$ when the input $t$ is 00 or 10 and which has the value $\gamma=(-pk-m)//pq+1)=(-pk)//(pq+1)-m+(pq+1-)-\mathrm{LT}((-pk)//(pq+1),m)$ when $t=01$. The quantity $\gamma$ is provided on line 183 by AND circuits 170 and 174, OR circuit 176, inverters 172, 173 and 180, adder 178, half-adder 182 and EXCLUSIVE OR circuit 184.

The input $k$ is coupled to AND circuit 170 and the input $(-pk)//(pq+1)$ is coupled to AND circuit 174. The input $t01$ is coupled to AND circuit 170 and through inverter 172 to AND circuit 174. Thus, when the $t$ input is either 00 or 10, then AND circuit 170 is conditioned to supply the input $k$ via OR circuit 176 to lines 177. These lines provide one input to adder 178. The carry input to adder 178 is permanently set to 1, and the remaining input $m$ to adder 178 is coupled through inverters 180, so that $m$ is substracted from the value on lines 177. The carry output from adder is coupled to inverter 173 which provides an output on line 175 when the substraction performed by adder 178 has a negative result. The output on line 175 is supplied to half-adder 182 and to EXCLUSIVE OR circuit 184. Half-adder 182 and EXCLUSIVE OR circuit thus seems to add $pq+1$ to the output of adder 178 whenever the output of adder 178 is negative. Hence, when the input $t$ is 00 or 10, the value $\gamma=(k-m)//(pq+1)=(k-m)+(pq+1)\mathrm{LT}(k,m)$ is provided on lines 183.

Similarly, when the input $t$ is 01, AND circuit 174 is conditioned to supply input $(-pk)//(pq+1)$ via OR circuit 176 to lines 177. Hence, adder 178, inverters 180 and 173, half-adder 182, and EXCLUSIVE OR circuit 184 serve as described previously to supply on lines 183 the quantity $\gamma=(-pk-m)//(pq+1)=(-pk)//(pq+1)-m+(pq+-1)\mathrm{LT}((-pk)//(pq+1),m)$.

The next quantity to be calculated by the module logic component is the enabling variable $b(i,j,b,t)=\mathrm{LT}(\gamma,pq)$. This variable is calculated by inverter 185, which operates on the high order bit of the previously calculated value $\gamma$.

The next two quantities to be calculated by the module logic component are the values $x$ and $\beta$. The value $x$ is provided on lines 187 as one input to adder 196, while $\beta$ is provided on line 189 as one input to adder 194. The values $x$ and $\beta$ are both derived from the previously calculated value $\gamma$, which is supplied via lines 183 to AND circuits 188, 190 and 192. When the input to is 00. the value $t00$ enables AND circuit 190, while AND circuits 188 and 192 are blocked. Thus lines 187 have the value $x=0$ while lines 189 have the value $\beta=\gamma$. Alternatively, when $t$ has the value 01, AND circuit 192 is enabled and AND circuits 188 and 190 are blocked, so that lines 187 have $x=\gamma$ and lines 189 have $\beta=0$. Finally, when $t$ has the value 10, AND circuit 188 is enabled and AND circuits 190 and 192 are blocked, so that lines 187 have $x=\gamma/q$ and lines 189 have $\beta=\gamma//q$.

The final quantity to be calculated by the module logic component is the memory location $1(i,j,k,t)=([-i+x]/p)s+(j+\beta)/q$. This quantity is calculated by adders 194 and 196 and half-adders 197 and 198.

Figure 9:
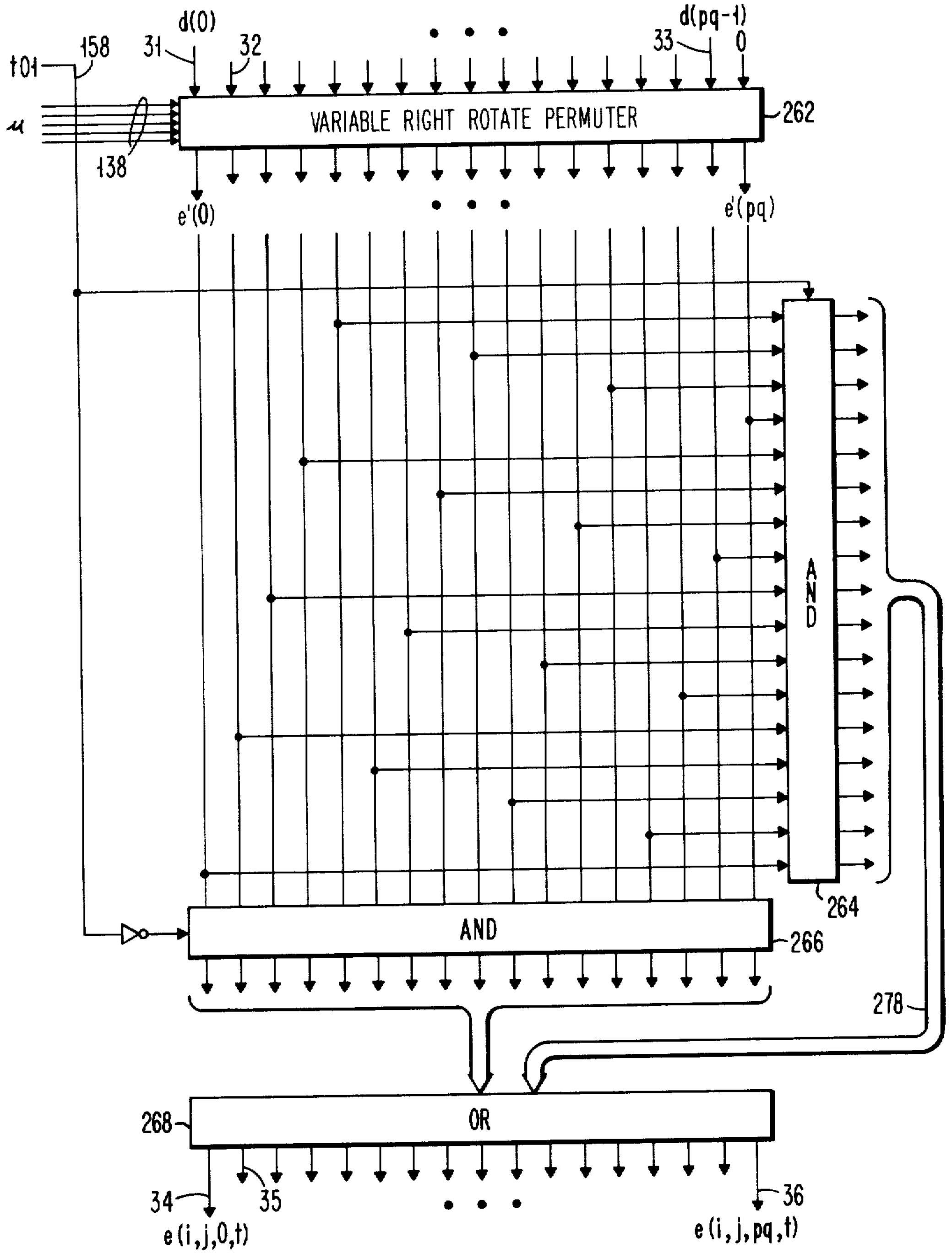
FIGS. 9 and 10 show detailed logic for the routing circuitry shown in FIG. 1.
Figure 10:
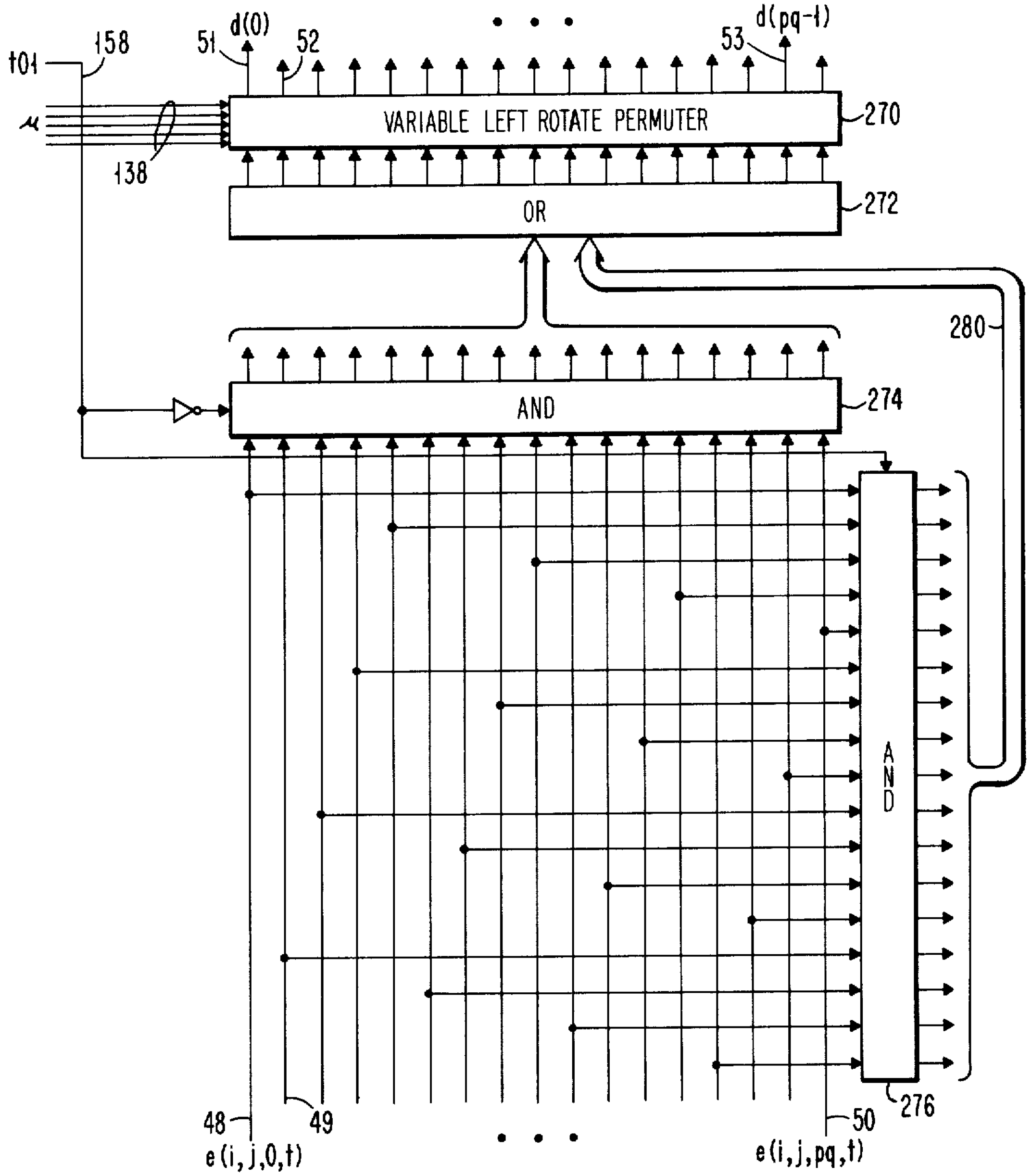

FIGS. 9 and 10 show the routing circuits which include permuters 25 and 26. Permuters 25 and 26 route the image points of a $1\times pq$, $pq\times 1$, or $p\times q$ subarray of points between the data register 24 and the memory modules 20, 21, 22. The routing circuitry is controlled by the bundle of signals C provided on lines 110 by the global logic component 100 of the address, control and enable circuitry 23 as shown in FIGS. 1 and 6.

Referring now to FIG. 9, there is provided permuter P1 that routes subarray points from the data register 24 to the appropriate memory modules 20, 21 and 22. This permuter has $pq$ data inputs $d(0)$, $d(1)$, . . ., $d(pq-1)$ via lines 31, 32 and 33, and it has $pq+1$ outputs $e(i,j,0,t)$, . . ., $e(i,j,pq,t)$ on lines 34, 35 and 36. A specific embodiment of permuter P1 is shown for the case $p=q=4$. This permuter is controlled by the values $t01$ and $\mu$ on lines 158 and 138, respectively. These two values together comprise the bundle of signals C provided by the global logic component 100 as shown in FIGS. 6 and 7.

As shown in FIG. 9, permuter P1 comprises a variable right rotate permuter 262 controlled by input value $\mu$ and a second permuter controlled by input $t01$. The inputs $d(0)$, $d(1)$, . . ., $d(pq-1)$, 0 to variable right rotate permuter 262 are rotated to the right by $\mu$ bit positions and are then provided as inputs $e'(0)$, . . ., $e'(pq-1)$ to the second permuter. When the value $t01$ is false, then the data is coupled directly through the second permuter in the same bit positions via AND circuit 266 and OR circuit 268 to the output $e(i,j,o,t)$, . . ., $e(i,j,pq,t)$. When the value $t01$ is true, AND circuit 264 is conditioned so that the data is shifter in position in multiples of 4. The data is transferred over wires 278 to corresponding bit positions in OR circuit 268 to the output $e$.

FIG. 10 provides a specific embodiment of the permuter P2 that routes subarray points from the memory modules 20, 21, and 22 to the data register 24. As indicated, permuter P1 comprises a first permuter controlled by input value $t01$ and to a variable left rotate permuter 270 controlled by $\mu$. This permuter has $pq+1$ data inputs $e(i,j,0,t)$ $e(i,j,1,t)$ . . . $e(i,j,pq,t)$ supplied on the data input lines 48, 49 and 50 and it has $pq$ data outputs $d(0)$, $d(1)$ . . . $d(pq-1)$ on lines 51, 52 and 53. The data inputs to permuter P1 are coupled through AND circuit 274 and OR circuit 272 to corresponding bit positions of the inputs of variable left rotate permuter 270 when the value $t01$ on line 158 is false. When the value $t01$ on line 158 is true then AND circuit 276 is conditioned so that the data is shifted in steps of 4 and transferred over wires 280 to OR circuit 272.

The output of OR circuit 272 are supplied as inputs to variable left rotate permuter 272, which rotates these values by $\mu$ positions. The ouputs $d(0)$, $d(1)$, . . ., $d(pq-1)$ of variable left rotate permuter 272 are routed via lines 51, 52 and 53 to data register 24.

While the invention has been particularly shown and described with reference to a preferred embodiment thereof, it will be understood by those skilled in the art that various changes in the form and details may be made therein without departing from the spirit and scope of the invention.

What is claimed is:

1. A word organized random access memory system modified for image processing operations so that the memory system can store an image array comprising a predetermined number $rpsq$ of image points arranged in a predetermined number $rp$ of rows with a predetermined number $sq$ of image points in each row, and modified so that every $1\times pq$ subarray, every $pq\times 1$ subarray and every $p\times q$ subarray of the $rp\times sq$ image array can be accessed in a single memory cycle, the system comprising:

memory means for storing $rpsq$ image points in the cells of $pq+1$ different memory modules, each memory module being an entity capable of storing $rs$ image points in distinguishable cells, only one cell of each module being accessible at any single instant of time;

means for selectively designating, from all $1 \times pq$ subarrays, all $pq \times 1$ subarrays and all $p \times q$ subarrays stored in said memory means, which subarray is to be accessed; and accessing means responsive to said designating means for causing each image point in the designated subarray to be selectively read from or written into a predetermined cell of a predetermined memory module so that the entire designated subarray is accessed in a single memory cycle.

2. A memory system according to claim 1 wherein the accessing means include:

a data register having a capacity of at least $pq$ image points;

routing circuitry for causing each image point to be routed between the data register and the predetermined memory module; and address calculation circuitry and enable circuitry coacting with the routing circuitry for causing each image point to be selectively retrieved from or written into the predetermined cell location of the predetermined module.

3. A memory system according to claim 1 wherein the designating means include:

means for designating the shape of the subarray to be accessed; and means for designating the location of the starting point of the subarray to be accessed.

4. A memory system according to claim 1 wherein the memory modules are labeled as modules 0, 1, . . ., $pq$, and wherein the memory module predetermined for storing the $j$th image point on the $i$th row of the image array is given by the relation $(iq+j)//(pq+1)$, which denotes the nonnegative remainder that results when the quantity $(iq+j)$ is divided by $(pq+1)$.

5. A memory system according to claim 1 wherein the cells of each memory module are labeled as cells 0, 1, . . ., $(rs-1)$, and wherein the cell predetermined for storing the $j$th image point on the $i$th row of the image array is give by the relation $(i/p)s+(j/q)$, which denotes the sum of two terms: $s$ times the quotient when $p$ is divided into $i$; and the quotient when $q$ is divided into $j$.

6. The memory system according to claim 4 wherein the means for calculating the relation $(iq+j)//(pq+1)$ comprises:

a plurality of cells for performing a modulo-$(pq+1)$ division, a plurality of adder means, means for coupling the cells and adder means in cascade to produce a calculating circuit, and means to enter signals corresponding to $i$ and $j$ as inputs to the calculating circuit so that the value $(iq+j)//(pq+1)$ is produced.

7. The memory system according to claim 4 wherein the means for calculating the relation $(iq+j)//(pq+1)$ comprises:

a first plurality of cells for performing a modulo-$(pq+1)$ division, on $pq$ times any value between 0 and $pq-1$, a second plurality of cells for performing a modulo-$(pq+1)$ division on any value between 0 and $2pq+1$, means for coupling said first cells to receive input signals and means to couple the output of said first cells to a cascade of alternating adder means and said second cells to produce a calculating circuit, and means to enter signals corresponding to $i$ and $j$ as inputs to the calculating circuit so that the value $(iq+j)//(pq+1)$ is produced.

8. A word organized random access memory system modified for image processing operations so that $pq$ image points of all $1 \times pq$ subarrays, all $pq \times 1$ subarrays and all $p \times q$ subarrays of at most an $rp \times sq$ image array I(*,*) storable in the memory system can be selectively retrieved from or written into the system in a single memory cycle; each image point $I(i,j)$ assuming a Boolean value when $i$ and $j$ lie in the respective ranges $0 \leq i < rp$ and $0 \leq j < sq$, the system comprising:

memory means for storing $rpsq$ image points in the cells of $pq+1$ different memory modules, each memory module being an entity capable of storing $rs$ image points in distinguishable cells, only one cell of each module being accessible at any single instant of time;

means for designating the shape of a subarray to be accessed, as for example, with $t=00$ for a $1 \times pq$ array, $t=01$ for a $pq \times 1$ array and $t=10$ for a $p \times q$ array;

means for designating the location of the starting point $I(i,j)$ of the subarray to be accessed;

a register for holding at least $pq$ image points;

routing circuitry for causing the appropriate subarray points to be routed between the $k$th memory module and position $\gamma$ of the register, where $k$ lies in the range $0 \leq k \leq pq$ and where $\gamma$ is defined by the relation $\gamma=(k-iq-j)//(pq+1)$ if $t=00$, or if $t=10$; which denotes the nonnegative remainder that results when the quantity $k-iq-j$ is divided by the quantity $pq+1$;

$$\gamma=[-p(k-iq-j)]//(pq+1) \text{ if } t=01,$$

which denotes the nonnegative remainder that results when the product of minus $p$ times the quantity $k-iq-j$ is divided by the quantity $pq+1$;

enabling circuitry for causing the $k$th memory module to store or retireve a subarray element if the previously defined value $\gamma$ is less than $pq$ and for inhibiting the $k$th memory module from storing or retrieving a subarray element if $\gamma=pq$; and addressing circuitry for determining the appropriate cell location $l(i,j,k,t)$ within the $k$th module according to the relation:

$$l(i,j,k,t)=(i/p)s+(j+\gamma)/q, \text{ if } t=00,$$

which denotes the sum of two terms: $s$ times the quotient $i/p$ and the quotient $(j+\gamma)/q$, where $\gamma=(k-iq-j)//(pq+1)$ is the value previously defined for $t=00$, $$l(i,j,k,t) = ([i+\gamma]/p)s+j/q, \text{ if } t=01,$$

which denotes the sum of two terms: $s$ times the quotient $(i+\gamma)/p$ and the quotient $j/q$, where $\gamma=[-p(k-iq-j)]//(pq+1)$ is the value previously defined for $t=01$;

$$l(i,j,k,t) = ([i+\gamma/q]/p)s+(j+\gamma//q)/q, \text{ if } t=10,$$

which denotes the sum of two terms: $s$ times the quotient that results when $p$ is divided into $i$ plus the quotient $\gamma/p$, and the quotient that results when $q$ is divided into $j$ plus the remainder when $\gamma$ is divided by $q$, where $\gamma = (k-iq-j)//(pq+1)$ is the value previously defined for $t=10$.

* * * * *